Aug. 18, 1942.    L. A. WOOD    2,293,325
SAFETY GAS VALVE
Filed June 26, 1941    2 Sheets-Sheet 1
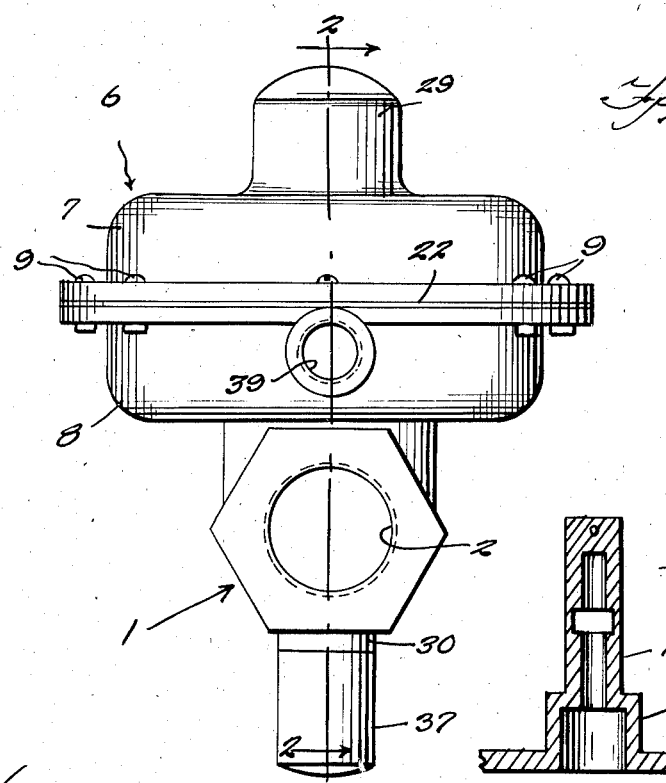
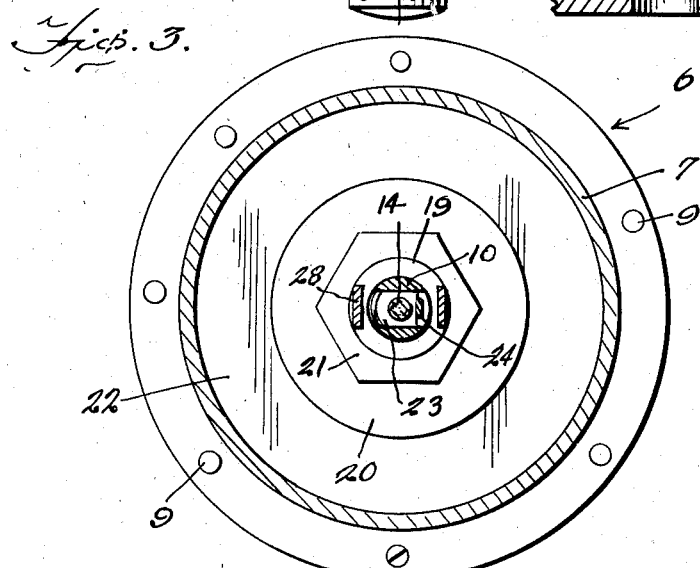
Inventor
Lawrence A. Wood
By Clarence A. O'Brien
Attorney Aug. 18, 1942.　　　L. A. WOOD　　　2,293,325
SAFETY GAS VALVE
Filed June 26, 1941　　　2 Sheets-Sheet 2
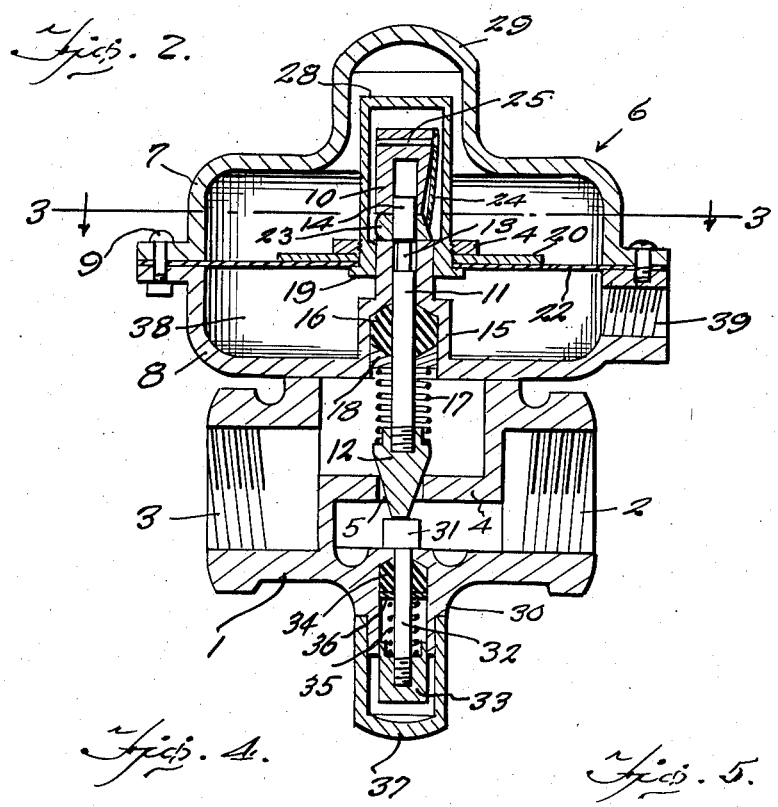
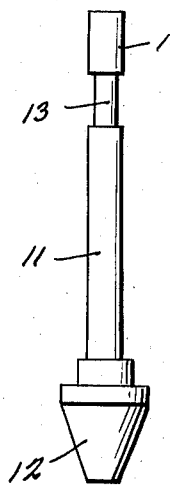
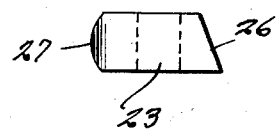
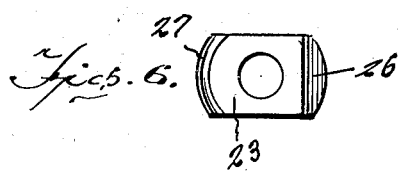
Inventor
Lawrence A. Wood
By Clarence A. O'Brien
Attorney Patented Aug. 18, 1942

2,293,325

UNITED STATES PATENT OFFICE 2,293,325

SAFETY GAS VALVE

Lawrence A. Wood, Newburgh, N. Y.

Application June 26, 1941, Serial No. 399,915

2 Claims. (Cl. 137—153)

The present invention relates to new and useful improvements in safety valves for use particularly in high pressure gas lines between the usual regulator and the gas cock.

The primary object of the invention is to provide, in a manner as hereinafter set forth, a safety valve of the aforementioned character which is adapted to automatically shut off the gas in the event of regulator failure from any cause.

Another very important object of the invention is to provide an automatic safety valve of the character described comprising novel pressure controlled means for releasably securing the valve in open position.

Still another very important object of the invention is to provide a safety gas valve of the character set forth which must be manually reopened after it has automatically closed.

Other objects of the invention are to provide a safety gas valve which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view of a safety gas valve constructed in accordance with the present invention.

Figure 2 is a view in vertical section through the device, taken substantially on the line 2—2 of Figure 1.

Figure 3 is a view in horizontal section, taken substantially on the line 3—3 of Figure 2.

Figure 4 is a detail view in elevation of the valve and stem.

Figure 5 is a detail view in elevation of the slidable latch.

Figure 6 is a detail view in top plan of the latch.

Figure 7 is a detail view in vertical section of the guide 10.

Referring now to the drawings in detail, it will be seen that the embodiment of the invention which has been illustrated comprises a body 1 of suitable metal having an inlet 2 and an outlet 3. Between the inlet 2 and the outlet 3 is an angular partition 4 having formed therein a valve opening 5 for the passage of gas.

Mounted on the body 1 is a diaphragm unit comprising a metallic casing which is designated generally by the reference numeral 6. The casing 6 includes complemental upper and lower sections 7 and 8, respectively, which are bolted together at 9. The lower section 8 is rigidly secured on the body 1 in any suitable manner.

Rising from the bottom of the section 8 is a tubular guide 10. Slidable in the guide 10 is a stem 11 which extends downwardly into the upper portion of the body 1. Mounted on the lower end portion of the stem 11 is a valve 12 which is engageable in the opening 5 for controlling the flow of gas therethrough. The stem 11 is provided with a reduced upper end portion 13 which terminates in a head 14.

The guide 10 includes an enlarged lower portion 15 which accommodates a packing 16 for the stem 11. A coil spring 17 below the packing 16 is engaged with the valve 12 for yieldingly urging said valve toward closed position in the opening 5. The upper end of the coil spring 17 is engaged beneath a packing washer 18.

Slidably mounted on the guide 10 is a flanged ring 19. Secured by a washer 20 and a nut 21 on the flanged ring 19 is a diaphragm 22. The peripheral portion of the diaphragm 22 is secured between the casing sections 7 and 8.

At an intermediate point the guide 10 is formed to accommodate a slidable latch 23 through which the stem 11 passes and through which said stem is slidable. A spring 24 is secured at 25 to the upper portion of the guide 10 and has one end engaged with a beveled end 26 of the latch 23 for yieldingly urging said latch toward operative position. The latch 23 further includes a rounded opposite end portion 27. Rising from the ring 19 is a substantially U-shaped member 28 which limits the sliding movement of the latch 23 in opposite directions. Rising from the casing section 7 is a dome 29 which accommodates the upper portions of the members 10, 28, etc.

Depending from the body 1 is an integral neck 30 which is aligned with the opening 5. Operable in the lower portion of the body 1 is a plunger 31 which is engageable with the valve 12 for opening said valve against tension of the coil spring 17. The plunger 31 includes a stem 32 which extends downwardly through the neck 30 and has threaded on its lower end portion a head 33. A packing 34 is provided for the stem 32. A coil spring 35 in the neck 30 has one end engaged with the head 33 and its other end engaged with a packing washer 36 for yieldingly resisting upward movement of the plunger 31. A removable cap 37 is provided on the neck 30.

The diaphragm 22 provides a pressure chamber 38 in the lower portion of the casing 6. This pressure chamber 38 is provided with an inlet 39.

In use, the body 1 is interposed in the line between the gas cock and the regulator. The chamber 38 of the diaphragm unit is connected to the regulator vent line at a point adjacent the mercury seal on the vent side. To open the valve to permit the flow of gas through the opening 5, the cap 37 is removed and the plunger 31 is forced upwardly against the tension of the coil spring 35. Thus, the valve 12 and the stem 11 are raised against the tension of the coil spring 17. When the valve 12 has been raised in this manner to open position it is secured by the latch 23 which, actuated by the spring 24, enters the reduction formed by the neck 13 and engages beneath the head 14 of the stem 11. Should the regulator fail gas under pressure from the vent line enters the chamber 38 and flexes the diaphragm 22 upwardly thereby raising the ring 19. When thus raised, the ring 19 engages the rounded end portion 27 of the latch 23 and shifts said latch against the tension of the spring 24 from beneath the head 14 thereby releasing the stem 11 and permitting the coil spring 17 to close the valve 12. From the foregoing it will be seen that the flow of gas through the high pressure service line will be positively shut off, the valve remaining closed until manually opened through the medium of the plunger 31. Further, the construction and arrangement is such that the valve cannot be latched in open position as long as the gas pressure in the chamber 38 is maintained.

It is believed that the many advantages of a safety gas valve constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A safety gas valve of the character described comprising a body, a partition in said body having an opening therein for the passage of gas, a casing mounted on said body, a guide in said casing, a stem slidable in said guide, a valve on said stem engageable in the opening in the partition for controlling the flow of gas therethrough, means for closing said valve, a latch slidable on the guide and engageable with the stem for releasably securing the valve in open position, and a diaphragm, operable by gas pressure in the casing, slidable on the guide and engageable with said latch for actuating said latch to inoperative position for releasing the stem.

2. A safety gas valve of the character described comprising a body, a partition in said body having an opening therein for the passage of gas, a casing, for the reception of gas under pressure, mounted on said body, a substantially tubular guide in said casing, a stem slidable in said guide, a valve on the stem engageable in the opening for controlling the flow of gas therethrough, a latch on the guide engageable with the stem for releasably securing the valve in open position, resilient means mounted on the guide and engaged with the latch for actuating said latch to operative position, a ring slidable on the guide and engageable with the latch for actuating said latch to inoperative position, a diaphragm in the casing connected to the ring for actuating said ring, and means for closing the valve.

LAWRENCE A. WOOD.